(12) United States Patent
Chiu et al.

(10) Patent No.: US 6,514,895 B1
(45) Date of Patent: Feb. 4, 2003

(54) ELECTRONICALLY TUNABLE CERAMIC MATERIALS INCLUDING TUNABLE DIELECTRIC AND METAL SILICATE PHASES

(75) Inventors: Luna H. Chiu, Abington, MD (US); Xubai Zhang, Columbia, MD (US); Louise Sengupta, Warwick, MD (US)

(73) Assignee: Paratek Microwave, Inc., Columbia, MD (US)

( * ) Notice: Subject to any disclaimer, the term of this patent is extended or adjusted under 35 U.S.C. 154(b) by 0 days.

(21) Appl. No.: 09/594,837

(22) Filed: Jun. 15, 2000

(51) Int. Cl.$^7$ .................. C04B 35/468; C04B 35/47
(52) U.S. Cl. .................. 501/137; 501/138; 501/139
(58) Field of Search .................. 501/137, 138, 501/139

(56) References Cited

U.S. PATENT DOCUMENTS

| | | | | |
|---|---|---|---|---|
| 3,760,244 A | * | 9/1973 | McClelland, Jr. | 501/137 |
| 4,266,265 A | * | 5/1981 | Maher | 361/321 |
| 4,925,817 A | * | 5/1990 | Ikeda et al. | 501/138 |
| 5,312,790 A | | 5/1994 | Sengupta et al. | |
| 5,427,988 A | | 6/1995 | Sengupta et al. | |
| 5,486,491 A | | 1/1996 | Sengupta et al. | |
| 5,604,166 A | | 2/1997 | Sasaki et al. | |
| 5,635,433 A | | 6/1997 | Sengupta | |
| 5,635,434 A | | 6/1997 | Sengupta | |
| 5,645,434 A | | 7/1997 | Leung | |
| 5,672,378 A | | 9/1997 | Maher et al. | |
| 5,686,367 A | | 11/1997 | Hayashi | |
| 5,693,429 A | | 12/1997 | Sengupta et al. | |
| 5,786,978 A | * | 7/1998 | Mizuno | 501/134 |
| 5,790,367 A | * | 8/1998 | Mateika et al. | 501/134 |
| 5,818,686 A | | 10/1998 | Mizuno et al. | |
| 5,830,591 A | | 11/1998 | Sengupta et al. | |
| 5,841,626 A | | 11/1998 | Sano et al. | |
| 5,846,893 A | | 12/1998 | Sengupta et al. | |
| 5,948,718 A | | 9/1999 | Kanba et al. | |
| 5,977,006 A | * | 11/1999 | Iguchi et al. | 501/137 |
| 5,995,360 A | | 11/1999 | Hata et al. | |
| 6,002,577 A | | 12/1999 | Wada et al. | |
| 6,074,971 A | | 6/2000 | Chiu et al. | |
| 6,087,287 A | * | 7/2000 | Iguchi et al. | 501/137 |
| 6,137,672 A | * | 10/2000 | Mizuno et al. | 501/134 |
| 6,185,087 B1 | * | 2/2001 | Park et al. | 501/137 |
| 6,251,816 B1 | * | 6/2001 | Maher et al. | 501/138 |

FOREIGN PATENT DOCUMENTS

| | | | |
|---|---|---|---|
| EP | 0615262 | | 1/1994 |
| GB | 761307 | | 11/1956 |
| JP | 70030986 | * | 3/1967 |
| JP | 52-9689 | | 3/1977 |
| JP | 62-262303 | | 11/1987 |
| JP | 404349302 | | 12/1992 |
| JP | 5-174626 | * | 7/1993 |
| JP | 406076627 | | 3/1994 |
| JP | 406150717 | | 5/1994 |
| JP | 406150718 | | 5/1994 |
| JP | 2000-26161 | * | 1/2000 |
| JP | 2000-143344 | * | 5/2000 |
| JP | 2000-154055 | * | 6/2000 |
| WO | WO 01/37365 | | 11/2000 |

OTHER PUBLICATIONS

Kupfer et al., "Craig McCaw Sees An Internet In The Sky", *Time Warner's Pathfinder*, May 27, 1996.

Evans, "New Satellites For Personal Communications", *Scientific American*, Apr. 1998, pp. 70–77.

Rao et al., "Phased Array Antennas Based on Bulk Phase Shifting with Ferroelectrics", *Integrated Ferroelectrics*, 1998, vol. 22, pp. 307–316. (No Month).

Zhou, Liqin, et al. "Electrical Properties of $Sr_{0.7}Ba_{0.3}TiO_3$ Ceramics Doped with $Nb_2O_5$, $3Li_2O\ 2SiO_2$, and $Bi_2O_3$" Communications of the American Ceramic Society, vol. 74, No. 11, 1991. No month.

\* cited by examiner

Primary Examiner—Karl Group
(74) Attorney, Agent, or Firm—Robert P. Lenart

(57) ABSTRACT

The present invention relates to electronically tunable dielectric materials which have favorable properties for many applications, including the area of radio frequency (RF) engineering and design. The electronically tunable materials include an electronically tunable dielectric phase such as barium strontium titanate in combination with a metal silicate phase such as $Mg_2SiO_4$. The electronically tunable materials may be provided in bulk, thin film and thick film forms for use in devices such as phased array antennas, tunable filters and the like.

18 Claims, 5 Drawing Sheets

ELECTRONICALLY TUNABLE CERAMIC MATERIALS INCLUDING TUNABLE DIELECTRIC AND METAL SILICATE PHASES

FIELD OF THE INVENTION

The present invention relates to electronically tunable ceramic materials which have favorable properties for many applications, including the area of radio frequency (RF) engineering and design. More particularly, the present invention relates to electronically tunable ceramic materials comprising a tunable dielectric phase such as barium strontium titanate (BSTO) in combination with a metal silicate phase.

BACKGROUND INFORMATION

Microwave devices such as electronically scanning antennas, phased array antennas, electronic down tilt antennas, electronically tunable filters, electronically tunable radar and tunable oscillators have been proposed for use, but their high costs have prevented widespread commercial implementation. The existence of low cost tuning technology would revolutionize the industry of microwave components and antennas. Tuning refers to the ability to change the dielectric constant of a material. This translates in the microwave component field as the ability to use the same component and change the frequency of operation by changing the input voltage or current. It can allow for a single filter to frequency-hop during operation. For antennas, being able to tune using low cost technology would create a new class of phased array antennas, which could be used in common households instead of being limited to large, expensive systems. Phased array antennas can be described as electronically scanning antennas. By using electronically scanning antennas, satellite communications can be available in many situations, because the antennas would allow for tracking of a satellite. This means voice and data communications can be done in a mobile arena. Also, mobile communications would be available at a global level without the need for major infrastructure.

A phased array refers to an antenna configuration composed of a large number of elements that emit phased signals to form a radio beam. The radio signal can be electronically steered by the active manipulation of the relative phasing of the individual antenna elements. This electronic beam steering concept applies to both the transmitter and the receiver. Phased array antennas are advantageous in comparison to their mechanical counterparts with respect to their speed, accuracy and reliability. The replacement of gimbal mounted mechanical antennas by phased array antennas increases survivability through more rapid and accurate target identification. For example, complex tracking exercises can be performed rapidly and accurately with a phased array antenna system.

Future communications will also require wideband communications using frequency-hopping techniques, so that large amounts of digital data can be transferred over the band. A critical component for these applications is a low cost, fast acting tunable filter. Digital data could be distributed or encoded over a band of frequencies in a sequence determined by control circuitry of the tunable filter. This would allow for several users to transmit and receive over a common range of frequencies.

Technologies for scanning that could possibly be adapted for phase shifter applications are ferrite phase shifters and semiconductor diode phase shifters. Although ferrites are currently the most widely used type of phase shifter materials they are mostly limited to military applications. The major reason for this is that they are very expensive to manufacture. Secondary reasons include the fact that they are not designed to work in a broadband situation. When the frequency changes, a new set of materials has to be designed and manufactured. They are also very bulky in size and heavy. Furthermore, such phase shifters are difficult or impossible to make in a planar configuration. Conventional ferrites are also driven by high power due to the fact that they activate based on current.

Conventional diode phase shifters are also high cost because they require active electronic circuits to be added to designs in order to compensate for their high loss at microwave frequencies. They do not have good power handling characteristics. When power is put through the diodes, they start to behave in a very non-linear fashion, or they break down. Diodes also require holding power in order to maintain accuracy, as well as power during switching.

Barium titanate is one of the known ceramics tunable at room temperature. Another known tunable ceramic is strontium titanate. However, this material by itself must be super cooled in order to have usable tuning characteristics. Other tunable dielectrics include lead zirconium titanates, $PbTiO_3$, $KNbO_3$, $LaTaO_3$ and other ferroelectric perovskites. The problem with these known ferroelectrics is that their losses are very high at room temperature. This makes these materials essentially useless at microwave frequencies. One way to combat this problem is by means of producing a low loss but still tunable composite material with reasonable dielectric constants.

Barium strontium titanate (BSTO) has been used for its high dielectric constant, on the order of 200 to 6,000, and its large change in dielectric constant with applied voltage, on the order of 25 to 75 percent at a field of 2 V/micron. Some prior art ferroelectric composite materials which include BSTO are disclosed in U.S. Pat. No. 5,427,988 to Sengupta et al. entitled "Ceramic Ferroelectric Composite Material BSTO-MgO"; U.S. Pat. No. 5,645,434 to Sengupta et al. entitled "Ceramic Ferroelectric Composite Material BSTO-Magnesium Based Compound"; and U.S. Pat. No. 6,074,971 to Chiu et al. entitled "Ceramic Ferroelectric Composite Materials with Enhanced Electronic Properties BSTO-Mg Based Compound—Rare Each Oxide".

The idea of a voltage tunable dielectric has been proposed for use in antenna applications in a paper entitled "Planar Microwave Electro-Optic Phase Shifters", Microwave Journal, Volume 35 (6), June 1992. There is a need for new materials which have desirable electronic properties in order to make this possible. As with most ferroelectrics which are tunable at room temperature, the losses at frequencies above 600 MHz become too high to use cost effectively. Also, high dielectric constants makes it virtually impossible to integrate and match them to RF circuits. This causes increased insertion losses.

The present invention has been developed in view of the foregoing, and to address other deficiencies of the prior art.

SUMMARY OF THE INVENTION

The present invention provides electronically tunable ceramic materials. The materials comprise at least one tunable dielectric phase such as barium strontium titanate of the formula $Ba_xSr_{1-x}TiO_3$. In the formula $Ba_xSr_{1-x}TiO_3$, x can be a value from 0 to 1, preferably from about 0.15 to about 0.6.

The present electronically tunable ceramic materials also include at least one metal silicate phase in an amount up to about 80 weight percent of the material. The metal silicate provides substantially improved characteristics such as good tuning while exhibiting low insertion losses, making the materials useful as tunable dielectrics for microwave applications. For example, with the addition of metal silicate compounds to barium strontium titanate, tuning characteristics are maintained while substantially lowering the loss. Also, the silicate materials decrease the dielectric constant of BSTO to usable design levels while maintaining tunability.

The materials are highly advantageous for microwave component designs because their tuning characteristics allow for the construction of devices having variable properties. Such variable properties allow for new designs, e.g., for filters which can vary the frequency of operation and allow for frequency-hopping of microwave devices, and for antennas to scan and track satellites electronically, as well as many other applications. The electronic properties of the present materials can be adjusted or tailored for a specific microwave application or design. Tunable materials with very low loss insertion are provided. In addition, the materials can be readily used in a wide range of frequencies, e.g., from 100 kHz to 60 GHz. Since the preferred materials require voltage changes in order to switch, very low current and power requirements are achieved.

An aspect of the present invention is to provide an electronically tunable dielectric material including a tunable dielectric phase and a metal silicate phase.

Another aspect of the present invention is to provide a method of forming an electronically tunable dielectric material. The method includes the steps of mixing particles of a tunable dielectric material and particles of a metal silicate, followed by sintering.

These and other aspects of the present invention will be more apparent from the following description.

DETAILED DESCRIPTION

Figure 1:
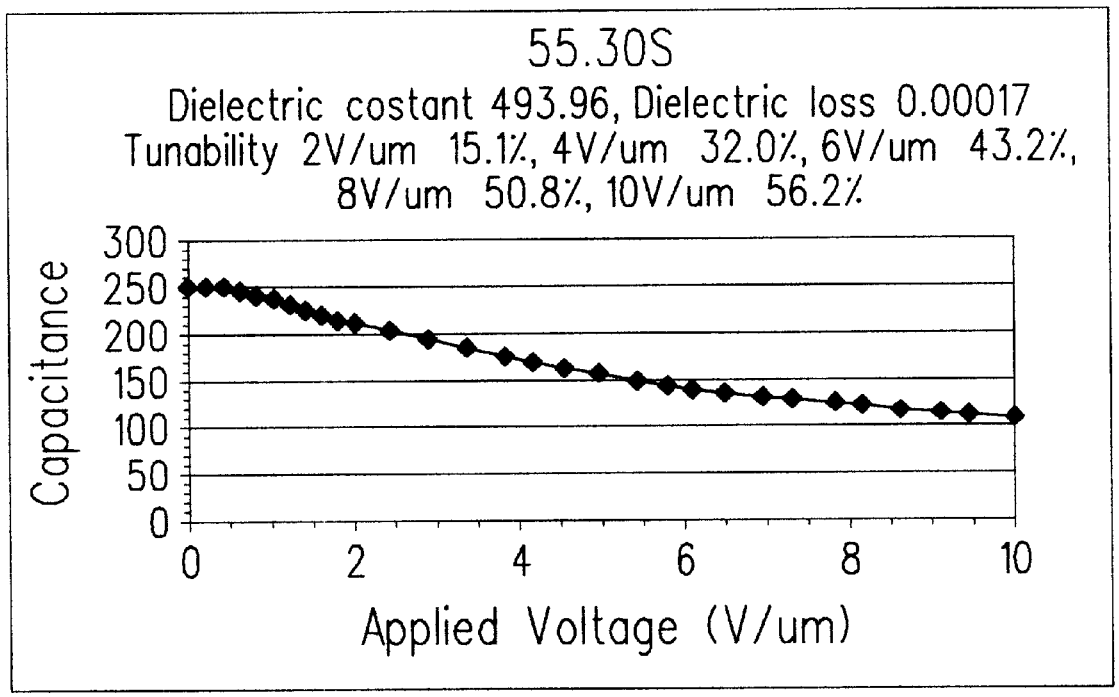
FIG. 1 is a graph of capacitance versus applied voltage for a tunable $BSTO/Mg_2SiO_4$ material in accordance with an embodiment of the present invention.
Figure 2:
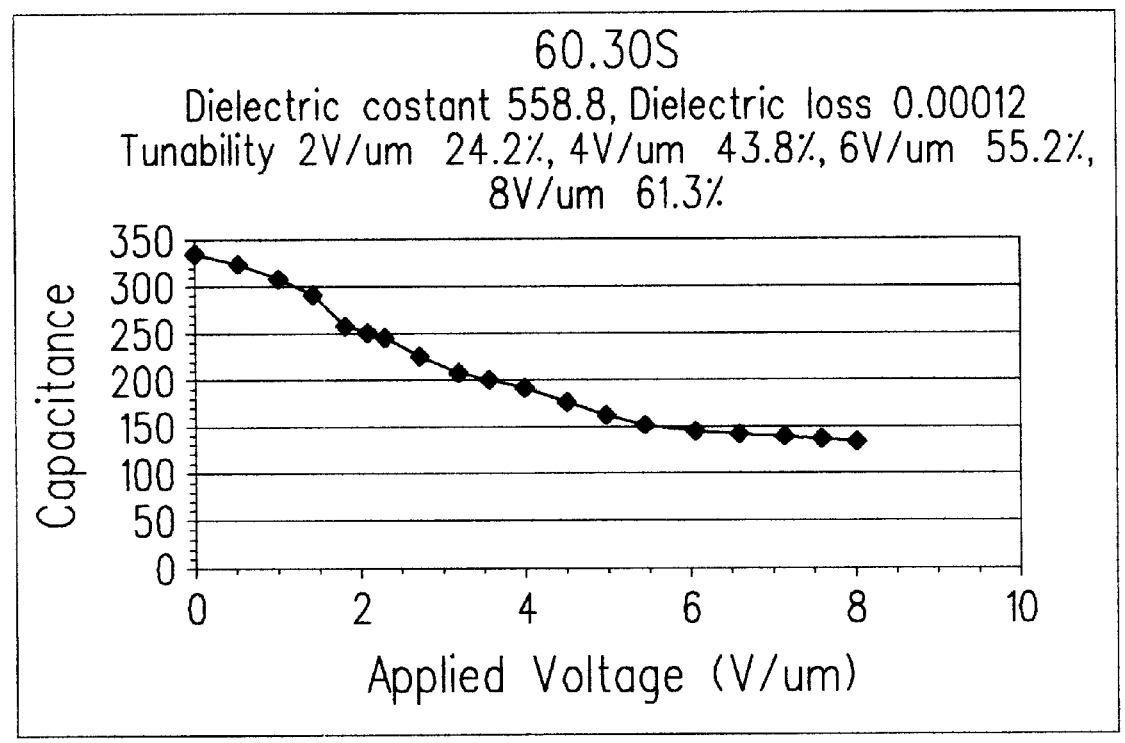
FIG. 2 is a graph of capacitance versus applied voltage for a tunable $BSTO/Mg_2SiO_4$ material in accordance with another embodiment of the present invention.

The present electronically tunable ceramic compositions comprise at least one electronically tunable dielectric phase, such as barium strontium titanate, in combination with at least one metal silicate phase. Barium strontium titanate of the formula $Ba_xSr_{1-x}TiO_3$ is a preferred electronically tunable dielectric material due to its favorable tuning characteristics, low curie temperatures and low microwave loss properties. In the formula $Ba_xSr_{1-x}TiO_3$, x can be any value from 0 to 1, preferably from about 0.15 to about 0.6. More preferably, x is from 0.3 to 0.6.

Other electronically tunable dielectric materials may be used partially or entirely in place of barium strontium titanate. An example is $Ba_xCa_{1-x}TiO_3$, where x can vary from about 0.2 to about 0.8, preferably from about 0.4 to about 0.6. Additional electronically tunable ferroelectrics include $Pb_xZr_{1-x}TiO_3$ (PZT) where x ranges from about 0.05 to about 0.4, lead lanthanum zirconium titanate (PLZT), lead titanate ($PbTiO_3$), barium calcium zirconium titanate ($BaCaZrTiO_3$), sodium nitrate ($NaNO_3$), $KNbO_3$, $LiNbO_3$, $LiTaO_3$, $PbNb_2O_6$, $PbTa_2O_6$, $KSr(NbO_3)$, and $NaBa_2(NbO_3)5$ $KH_2PO_4$.

In addition to the electronically tunable dielectric phase, the present electronically tunable materials include at least one metal silicate phase. The metal silicates may include metals from Group 2A of the Periodic Table, i.e., Be, Mg, Ca, Sr, Ba and Ra, preferably Mg, Ca, Sr and Ba. Preferred metal silicates include $Mg_2SiO_4$, $CaSiO_3$, $BaSiO_3$ and $SrSiO_3$. In addition to Group 2A metals, the present metal silicates may include metals from Group 1A, i.e., Li, Na, K, Rb, Cs and Fr, preferably Li, Na and K. For example, such metal silicates may include sodium silicates such as $Na_2SiO_3$ and $NaSiO_3-5H_2O$, and lithium-containing silicates such as $LiAlSiO_4$, $Li_2SiO_3$ and $Li_4SiO_4$. Metals from Groups 3A, 4A and some transition metals of the Periodic Table may also be suitable constituents of the metal silicate phase. Additional metal silicates may include $Al_2Si_2O_7$, $ZrSiO_4$, $KAlSi_3O_8$, $NaAlSi_3O_8$, $CaAl_2Si_2O_8$, $CaMgSi_2O_6$, $BaTiSi_3O_9$ and $Zn_2SiO_4$ and other silicates of B, Fe, Mn, Cu, Ce, Cr, La, Y, Ti, Ta, Nb, Mo, W, Ni, Pd, Pb and Bi.

The metal silicate phase is typically present in an amount of from about 1 to about 80 weight percent of the material, preferably from about 3 to about 65 weight percent, and more preferably from about 5 to about 60 weight percent. In a particularly preferred embodiment, the metal silicate comprises from about 10 to about 50 weight percent of the material. Although metal silicates in amounts of from 1 to 80 weight percent are typically used, smaller additive amounts of from 0.01 to 1 weight percent may be used for some applications.

In addition to the electronicaly tunable dielectric and metal silicate phases, the present materials may include optional additions such as oxides of Nd, Ba, Mg, Zr, Ca, Fe, Sr, Nb, Ta, Cr, Sn, Mn, W, Al, Ti, Na and/or K. For example, other rare earth oxides such as $Nd_2O_3$ and $Pr_7O_{11}$, may be used. Such additional materials may be present in amounts up to about 10 weight percent.

As used herein, the term "electronically tunable dielectric material" means a material that exhibits a variable dielectric constant upon the application of a variable voltage and/or current. The term "voltage tunable dielectric material" as used herein means a material that exhibits a variable dielectric constant with a variable applied voltage. The tunability may be defined as the dielectric constant of the material with an applied voltage divided by the dielectric constant of the material with no applied voltage. Thus, the voltage tunability percentage may be defined by the formula: T=((X-Y)/X)·100, where X is the dielectric constant with no voltage and Y is the dielectric constant with a specific applied voltage. A preferred voltage tunable dielectric material exhibits tunability of at least about 10 percent at 8 V/micron. More preferably, the voltage tunable dielectric material exhibits a tunability of from about 20 to about 75 at 8 V/micron.

In accordance with the present invention, the combination of tunable dielectric materials such as BSTO with metal silicates allows the materials to have high tunability, low loss and tailorable dielectric properties, such that they can be used in microwave frequency applications. The materials demonstrate improved properties such as increased tuning, reduced loss tangents, reasonable dielectric constants for many microwave applications, stable voltage fatigue properties, higher breakdown levels than previous state of the art materials, and improved sintering characteristics. A particular advantage of the present materials is that tuning is dramatically increased compared with conventional low loss tunable dielectrics. The tunablitiy and stability achieved with the present materials enables new RF applications not previously possible. A further advantage is that the materials may be used at room temperature. The electronically tunable materials may be provided in several manufacturable forms such as bulk ceramics, thick film dielectrics and thin film dielectrics.

The present materials can be produced by conventional manufacturing processes. For example, powder forms of $BaTiO_3$ and $SrTiO_3$ may be mixed to form the desired stiochiometry of the electronically tunable dielectric phase. The powders may be ball-milled in either a liquid solvent or deionized water, or dry mixed with ceramic grinding media for approximately 24 hours. The tunable dielectric phase and the metal silicate phase preferably have an average particle size of from about 0.1 to about 5 micron, more preferably from about 1.5 to about 2.5 micron. These powders are then allowed to dry. The mixed powder is then calcined at temperatures of from about 800° C. to about 1200° C. to form BSTO. The calcined powder may then undergo another mixing step with the metal silicate in the desired ratios to form the composite. This mixing step may be performed in a liquid medium or dry. During mixing conventional binders may or may not be added. The composite powder is then dried and ground to a workable particle size. At this point the powder may be made into several different forms that can be characterized as bulk materials, thick films or thin films.

The composite powder made using the above specifications may be compacted to form a shape. This process can be performed by isostatic pressing or uniaxial pressing. The green ceramic body is then fired at the desired temperature in order to densify the compact. Electrodes may be placed on the sintered ceramic via a hybrid or thin film method to the specifications of a desired design.

The composite powder may also be blended with a polymeric binder for tape casting. The tape casting slurry may be pumped into a tape caster with a doctor blade set for a desired thickness. As the caster moves a carrier sheet such as Mylar under the doctor blade, the slurry forms a film of the desired thickness. The film is allowed to dry and then it is cut and/or slit to the shape needed. This green body is then fired with the appropriate binder burn out schedule. The sintered part may undergo an annealing stage dependent upon the quality of the fired tape. The tapes can then be electroded in a manner similar to the bulk material.

Alternatively, the composite powder can then be mixed with a polymeric binder for screen printing. The slurry may be gently blended and then placed in a 3-roll mill or attritor mill to throughly mix the slurry. The ceramic ink is then printed using a screen with the appropriate mesh and emulsion for the desired finished print thickness. The ceramic may be printed onto any suitable substrate, e.g., a ceramic substrate such as MgO. The film is then sintered. In some cases, the sintering temperature of these films can be up to 200° C. lower than the sintering temperature of the bulk material. The films are then metallized with a pattern necessary for the desired device. For example, in the case of varactors, over one hundred varactors can be put on a single chip and diced out for placement into microwave devices.

The fabrication processes primarily described herein deal with the production of bulk materials and thick film slurries. However, other suitable processing methods include die casting, injection molding, uniaxial pressing, isostatic pressing, tape casting, roll compaction and the like.

In accordance with an embodiment of the invention, the present materials may be incorporated in phased array antennas which are compact, light and relatively inexpensive to make and operate. The tunable dielectric materials can be used as replacements for the more expensive and high power driven ferrites currently used in large scale phased arrays. The present materials are also much more compact, and may be cheaper than mechanically scanning antennas. The present materials also have the advantage of lower loss without amplification than semiconductor tunable devices at microwave frequencies.

In the applications of the present materials in electronically scanning antennas and other microwave devices such as tunable filters, important electronic properties include dielectric constant, insertion loss and tunability.

The dielectric constant or permittivity of at material is a complex quantity defined as $\in = \in' - i\in''$. It is a measure of the amount of charge that can be stored in a material. In general, for most applications dielectric constants should be in the range of 10 to 1,500. A lower dielectric constant is preferable for waveguides so that impedance matching is easier. However, in some co-planar devices such as varactors or delay lines higher dielectric constant materials yield reasonable sizes for lines and spacings.

The dielectric constants of the present materials preferably range from about 15 to 1,500, and may be tailored to a particular application. In many cases, a lower dielectric constant on the order of 100 is needed for ease of matching into the circuit. In other cases, such as varactor based filters, a higher dielectric constant such as 300 to 400 may be needed to achieve the correct capacitance required for a specific frequency band. For some RF applications, such as delay lines, very high dielectric constants, e.g., 800 to 1,000, are needed to obtain the correct delay.

The loss tangent is a measure of the dissipation of microwave energy in a device and can be defined as $\in''/\in$ Lower loss tangents are usually desirable. Depending on the frequency of an application, usable loss tangents are usually below 0.04. If low loss tangent at high microwave frequencies can be achieved, cheaper devices may be provided because there is no need for active amplification of signals. The addition of the metal silicate phase in the present materials decreases the insertion loss substantially. Losses at 10 GHz in many cases are below 0.02, and for some compositions the loss at 24 GHz is below the 0.04 level.

Tunability is a measure of how much the dielectric constant changes with applied voltage. High tunability is desirable for most applications. For example, in the case of waveguides higher tunability will allow for shorter pieces, resulting in lower insertion loss in the overall device. Higher tunability will result in a large angle of sweep at lower operating voltages. As noted previously, the tunability percentage can be calculated as follows: $T=((X-Y)/X) \cdot 100$, where X is the dielectric constant at zero voltage and Y is the dielectric constant at a specific applied voltage.

The present materials exhibit high tunabilities, e.g., at least about 10 percent at an electric field of 8 V/micron, preferably at least about 20 percent. In accordance with an embodiment of the present invention, the tunability of barium strontium titanate is preserved in compositions which additionally contain a metal silicate phase. The tunability preferably ranges from a few percent to over 25 percent at a field of 2 V/micron. The tunability of these materials is superior to the current state of the art.

a more linear increase in tuning compared with the current state of the art materials. These materials also show a good resistance to breakdown even at high voltages. For example, several different compositions have been held at 9 V/micron for several days without exhibiting any changes. Also, cycling tests have shown that the tuning of these materials may fall within a +/−1% value for 1,000 cycles or more.

The present materials are also very robust because compositions produced from lower purity commercial grade materials have been found to possess electronic properties very similar to samples made from high purity materials. The production of these compositions using starting powders from several different manufacturers exhibit electronic properties within acceptable standard deviations. The present materials can also be processed in water, which saves cost and is more environmentally sound than solvent processing.

Electronic properties of some of the materials of the present invention are shown in Tables 1–3 and in FIG. 1. The properties achieved in accordance with the present invention are significant because the material maintains high tuning with low microwave losses with addition of a second phase. The dielectric constant of the composite is readily tailorable. In addition the second phase allows the composite materials to have a lower sintering temperature than BSTO by itself. It also has high breakdown voltages and can be water processed.

TABLE 1

Low Frequency Data for $Ba_xSr_{1-x}TiO_3$ with varying Weight Percent Magnesium Silicate

| Weight Percent $Mg_2SiO_4$ | Dielectric Constant (1 MHz) | Loss (1 MHz) | Tuning 2V/micron | Tuning 4V/micron | Tuning 6V/micron | Tuning 8V/micron | Curie Temp. °C. |
|---|---|---|---|---|---|---|---|
| $Ba_{50}Sr_{50}TiO_3$ | | | | | | | |
| 50 | 106.4 | 0.0010 | 8.4 | 19.2 | 27.1 | 32.9 | −50 |
| $Ba_{55}Sr_{45}TiO_3$ | | | | | | | |
| 10 | 1508.69 | 0.00026 | 18.0 | | | | |
| 20 | 857.86 | 0.000313 | 18 | | | | |
| 30 | 493.96 | 0.000174 | 15 | 32.0 | 43.2 | 50.8 | −30 |
| 40 | 277.38 | 0.000403 | 16 | 32.6 | 42.9 | 50.0 | |
| 50 | 79.82 | 0.000512 | 9.5 | 18.7 | 23.8 | 28.5 | |
| 60 | 64.79 | 0.000338 | 7.3 | 14.4 | 19.5 | 23.4 | |
| 70 | 14.4 | 0.0017 | 0.13 | | | | |
| $Ba_{60}Sr_{40}TiO_3$ | | | | | | | |
| 30 | 559 | 0.0012 | 24.2 | 43.8 | 55.2 | 61.3 | −15 |
| 35 | 478 | 0.0011 | 27.8 | 46.3 | 56.0 | 62.2 | −15 |

In accordance with an embodiment of the present invention, at RF frequencies, the dielectric constant of $Ba_xSr_{1-x}TiO_3$ can be decreased to usable values for microwave designs. The present materials also decrease the loss of the baseline BSTO materials such that these ceramics can now be considered for passive device designs at higher frequencies such as 600 MHz and above. The tunability of these materials is also maintained from the baseline BSTO materials. Tuning characteristics for these materials is much better than that of the current state of the art.

In addition to favorable dielectric constant, insertion loss and tunability properties, other advantages are achieved by the present compositions. This class of materials has shown

TABLE 2

Low Frequency Data for $Ba_{55}Sr_{45}TiO_3$ with varying Weight Percent Calcium Silicate

| Weight Percent $CaSiO_3$ | Dielectric Constant (1 MHz) | Loss (1 MHz) | Tuning 2V/ micron | Tuning 4V/ micron | Tuning 6V/ micron | Tuning 8V/ micron |
|---|---|---|---|---|---|---|
| 10 | 740.46 | 0.006 | 9.57 | 23.80 | 35.21 | 44.12 |
| 15 | 347.67 | 0.0019 | 4.03 | 11.47 | 18.36 | 23.33 |
| 20 | 138.17 | 0.0012 | 0.31 | 1.30 | 2.90 | 4.53 |
| 30 | 84.52 | 0.00018 | 0.20 | 0.90 | 1.52 | |

TABLE 3

High Frequency Data for $Ba_{.55}Sr_{.45}TiO_3$ with varying Weight Percent Magnesium Silicate

| Weight Percent $Mg_2SiO_4$ | Dielectric Constant (10 GHz) | Loss (10 GHz) | Dielectric Constant (24 GHz) | Loss (24 GHz) | Tuning 2V/micron | Tuning 4V/micron | Tuning 6V/micron | Tuning 8V/micron |
|---|---|---|---|---|---|---|---|---|
| 30 | 439.20 | 0.02 | 376.56 | 0.073 | 15 | 32.0 | 43.2 | 50.8 |
| 40 | 225.67 | 0.0185 | 214.11 | 0.0506 | 16 | 32.6 | 42.9 | 50.0 |
| 50 | 76.46 | 0.0145 | 68.86 | 0.027 | 9.5 | 18.7 | 23.8 | 28.5 |
| 60 | 46.4 | 0.0087 | 42.12 | 0.023 | 7.3 | 14.4 | 19.5 | 23.4 |

Figure 3:
FIG. 3 illustrates an isostatically pressed bulk sample of $BSTO/CaSiO_3$ in accordance with an embodiment of the present invention.

An example of a uniaxial pressed bulk part is shown in FIG. 3. Large bulk parts of this material may also be made by iso-static pressing. To press a uniaxial part, the powders may include a conventional binder to help hold the part together. The pressed material shown in FIG. 3 contains a basic acrylic binder in an amount of 2% by weight. The powder was measured, placed in a metal die, and pressed to a pressure between 5,000 and 10,000 psi. In the case of isostatic pressing, the powder may be packed into a molded rubber container. The container is sealed with only a small tube opening. This tube is then attached to a vacuum pump and the air is pumped out of the bag. After the vacuum sealing process is done, the tube is clamped and the bag is placed in a container in an isostatic press. The isostatic press typically uses hydraulic pressure to place 30,000 to 60,000 psi of pressure onto the part. The green ceramic density is approximately 60 percent of theoretical.

Figure 4:
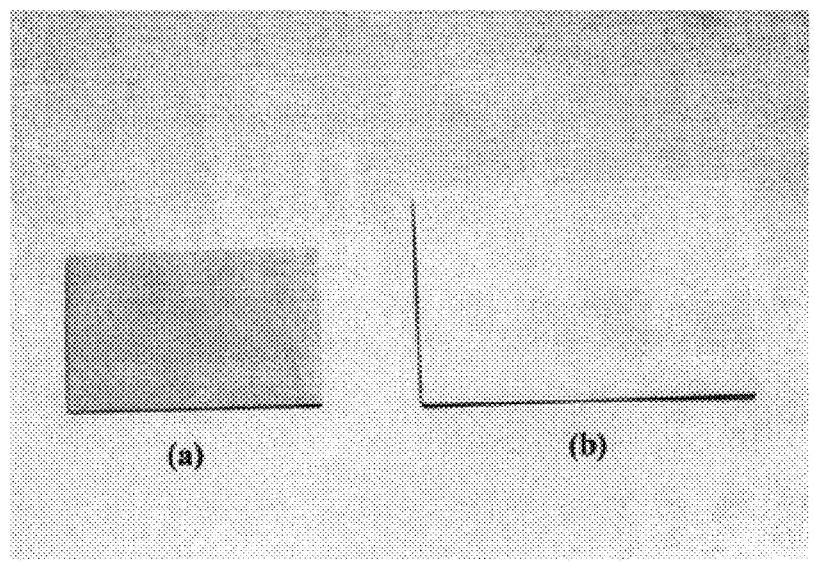
FIG. 4 illustrates a sintered tape and a green tape of a composite material in accordance with an embodiment of the present invention.

A green tape and a sintered tape are shown in FIG. 4. The tape cast part can be made by adding a dispersant and solvent system to a jar mill with the powders and liquid mixing media and mixing balls. Dispersion is performed typically from 18 to 24 hours. After the dispersion process, plasticizers and binder are preferably added and the total mixture is mixing for several hours. The tape slurry is de-aired by vacuum. At this point the slurry is injected into tape caster and cast. The tape is dried, cut and sintered. The sinter process includes a binder burn out stage and a sintering stage.

Figure 5:
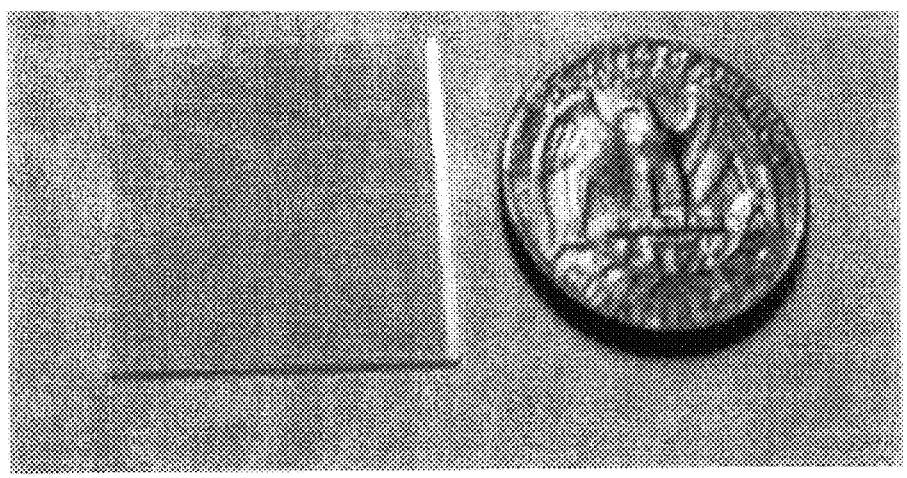
FIG. 5 illustrates a screen printed thick film of $BSTO/Mg_2SiO_4$ on a MgO crystal substrate in accordance with an embodiment of the present invention.

Another method of processing is to screen print a film of this material, as shown in FIG. 5. For example, powder forms of $BaTiO_3$ and $SrTiO_3$ may be mixed to form the desired stoichiometry. The powders are ball-milled in either a liquid solvent, de-ionized water or dry mixed with ceramic grinding media for several hours. These powders are then allowed to dry. The mixed powder is then calcined to form BSTO. The calcined powder then undergoes another mixing step with another or several other phase powders in the correct ratios to form the ceramic composite. This mixing is performed in either a liquid medium or dry. This composite powder is then dried and ground to a workable particle size. At this point the powder is mixed in the desired ratio with a screen print binder system which preferably contains a combination of medium and solvent. The ratio of ceramic filler in most cases is based on a 70 to 75 percent solids loading by weight. The ink is typically mixed on a 3-roll mill. However, other mixing methods work as well. A typical amount of time for mixing is about 30 minutes. During the mixing process the powder may be allowed to flow through the mill to allow for uniform mixing. A viscosity test is preferably performed after the ink is made. The viscosities of the inks usually range from 35,000 to 65,000 cps depending on the screens and the types of patterns which will be printed. Other tests such as rheology tests may be performed as needed depending on the application.

Figure 6:
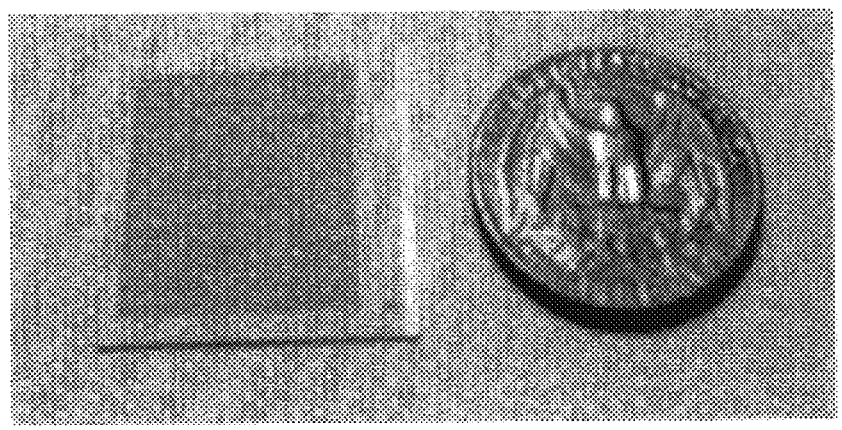
FIG. 6 illustrates multiple co-planar varactors printed on a film of $BSTO/Mg_2SiO_4$ on an $Al_2O_3$ substrate in accordance with another embodiment of the present invention.

Once the present materials are printed or formed, microwave structures can be placed on top of the films, for example, as shown in FIG. 6. The electrode pattern in FIG. 6 was placed by a lift-off photolithography method. After the photolithographic method is finished, a blanket deposition of E-beam gold is placed onto the film. The photoresist is then stripped and the patterned gold remains on the substrate.

Figure 7:
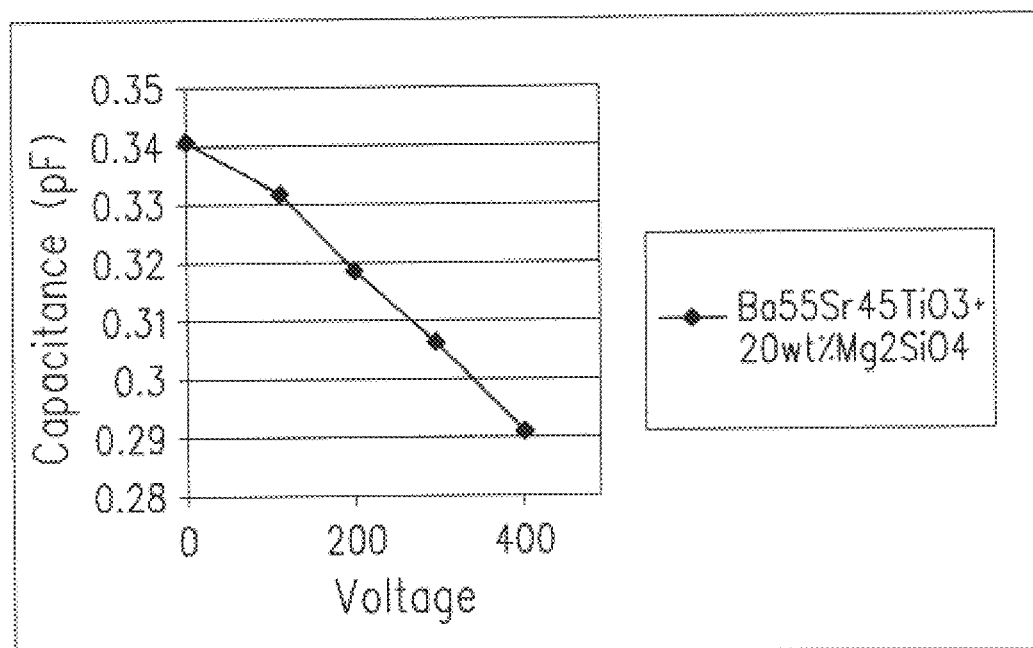
FIG. 7 is a graph of capacitance versus voltage, demonstrating varactor tuning characteristics of a $BSTO/Mg_2SiO_4$ material in accordance with an embodiment of the present invention.

Characteristics of a varactor on a film of the present material is shown in FIG. 7. The varactor was made by printing a thick film ink of the tunable dielectric onto a substrate by a screen printing process. The dielectric ink is forced through a wire screen in a pattern that is determine by the screen. The dielectric pattern is then sintered. The substrate then undergoes a lift-off photolithography process and E-beam gold desposition process. Hundreds of varactors may be made on the substrate. Each of the varactors are singulated by a dicing saw and each of these varactors can be tested. As shown in the graph of capacitance versus voltage illustrated in FIG. 7, the tuning characteristics of the $BSTO/Mg_2SiO_4$ varacter are very favorable, particularly for the thick film form of the dielectric material.

Figure 8:
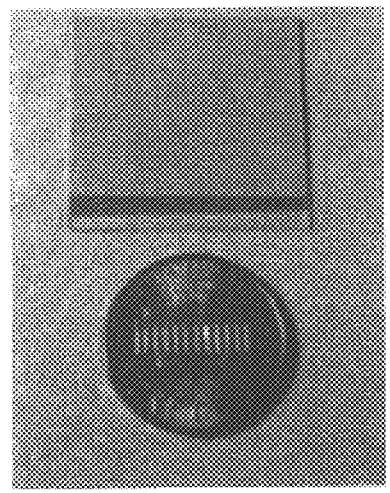
FIG. 8 illustrates a thick film $BSTO/Mg_2SiO_4$ material with a platinum bottom electrode on an MgO carrier substrate in accordance with another embodiment of the present invention.

Other types of thick film structures include vertical capacitors where a metallic layer is printed and fired, then the ceramic in question is fired on top. An example of this structure is shown in FIG. 8. The process for making this device is similar to that as described for the varactors. The difference is that a film of platinum was placed on the substrate prior to the thick film in order to form the bottom electrode A subsequent step would be to place a pattern on top of a ceramic substrate. Thin films of these material can also be produced.

The present materials also exhibit favorable voltage handling characteristics. The materials preferably withstand very high fields and voltages without structural or ionic breakdowns. An example of this characteristic is shown in Table 4 under an 8 V/micron amplified field. The zero leakage current shown in Table 4 is significant in view of the fact that the base material is BSTO. Typically, BSTO is considered a type II dielectric which exhibits leakage over time and temperature. This causes reduced reliability in the part. With the additions of silicates to the base structure the reliability of the dielectric increases.

TABLE 4

Voltage Handling Characteristics over Time of BSTO with $Mg_2SiO_4$

| Time (minutes) | 30 | 60 | 120 | 180 | 240 | 300 | 360 | 420 | 480 | 600 | 960 |
|---|---|---|---|---|---|---|---|---|---|---|---|
| Leakage Current (mA) $Ba_{.55}Sr_{.45}TiO_3 + Mg_2SiO_4$ (high purity) = 50 wt % | 0.000 | 0.000 | 0.000 | 0.000 | 0.000 | 0.000 | 0.000 | 0.000 | 0.000 | 0.000 | 0.000 |
| Leakage Current (mA) $Ba_{.55}Sr_{.45}TiO_3 + Mg_2SiO_4$ (industrial grade) = 50 wt % | 0.000 | 0.000 | 0.000 | 0.000 | 0.000 | 0.000 | 0.000 | 0.000 | 0.000 | 0.000 | 0.000 |

Figure 9:
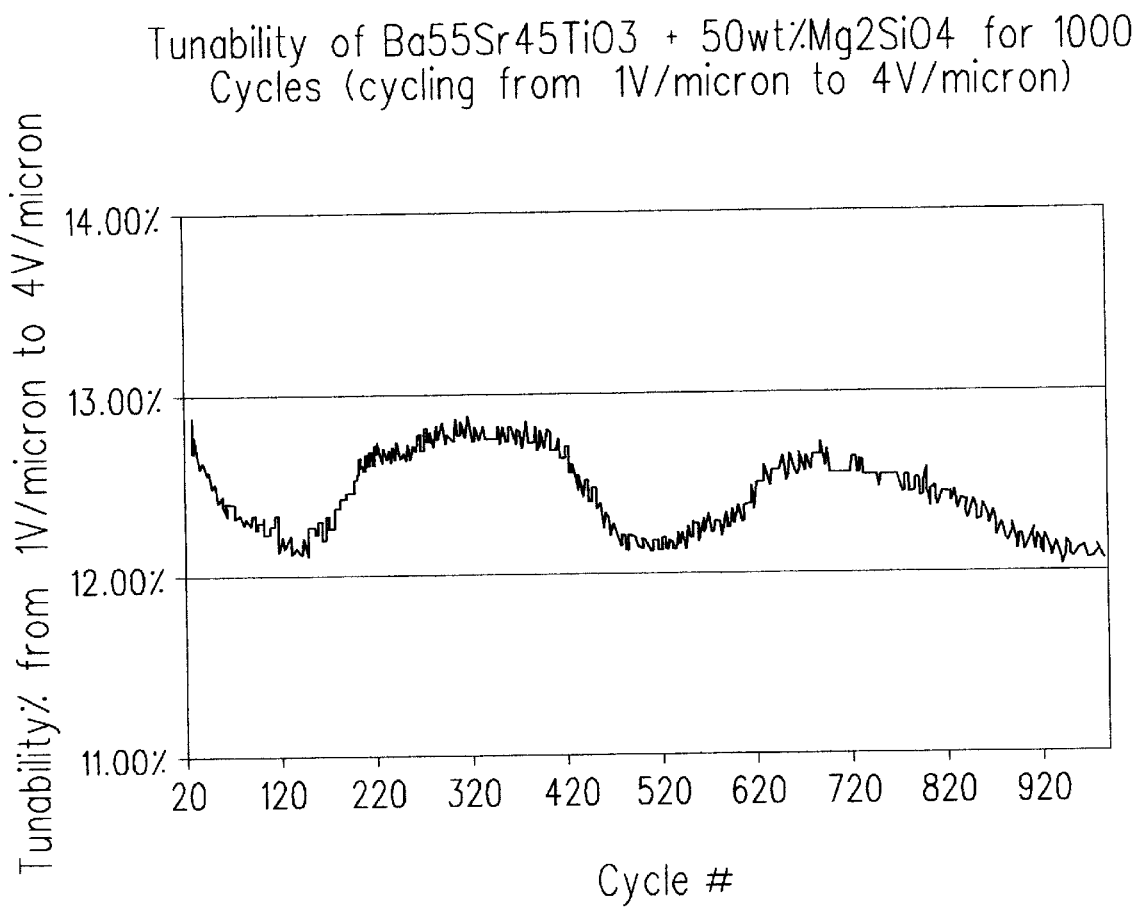
FIG. 9 is a graph of tunability percentage from 1 to 4 V/micron versus frequency, demonstrating the tunability of a $BSTO/Mg_2SiO_4$ material in accordance with an embodiment of the present invention.

The present materials also exhibit good tuning stability, e.g., over 1,000 cycles as shown in FIG. 9. The tuning remains within 1 percent of the initial value throughout the total cycles. These characteristics increase the ease with which these materials can be placed in the field.

In accordance with an embodiment of the present invention, the addition of silicate based compounds substantially reduces the sintering temperature of barium strontium titanate, in some cases by more than 350° C. For example, the sintering temperatures of BSTO materials can be decreased by 200° C.–300° C. or more in comparison with BSTO alone. An example of this effect is demonstrated when nanosized barium strontium titanate previously deemed not sinterable was densified when $Mg_2SiO_4$ was added to the compound. This opens up a new class of fine grain size materials with improved microwave properties.

The materials listed in Table 5 incorporate $Mg_2SiO_4$ with nanosized BSTO powder having an average particle size of about 1.5 micron.

TABLE 5

Electronic Properties of Sintered Nanosized Powders using $Mg_2SiO_4$ as a Sintering Aid

| Barium Content of Nanosized Powder (mol %) | $Mg_2SiO_4$ (w %) | Dielectric Constant (1 MHz) | Loss (1 MHz) | Tuning 2V/ micron | Tuning 4V/ micron | Tuning 6V/ micron | Tuning 8V/ micron |
|---|---|---|---|---|---|---|---|
| 50 | 30 | 310.82 | 0.0012 | 10.6 | 24.7 | 35.5 | 43.3 |
| 50 | 60 | 50.06 | 0.0012 | 9.6 | 17.9 | 23.6 | 27.6 |
| 55 | 30 | 332.60 | 0.0014 | 17.6 | 35.4 | 46.4 | 53.7 |
| 55 | 40 | 274.60 | 0.0014 | 24.9 | 41.1 | 50.2 | |
| 60 | 35 | 650.8 | 0.0018 | 40.15 | 60.1 | 69.1 | 74.2 |
| 60 | 40 | 462.0 | 0.0018 | 41.07 | 58.56 | 66.7 | |
| ? | 0 | | | | | | |

The results shown in Table 5 are significant because the nanosized BSTO powder was previously not considered sinterable, even at sintering temperatures well above that of baseline BSTO. When the silicate is added to these materials, they can be sintered at relatively low temperatures. In the case of the nanosized BSTO powder, the silicates decreased the sintering temperature by more than about 400° C.

The present materials enable many new applications in broadband wireless communications that are currently not possible. In addition, the materials allow for components and antennas to be built at a low cost so that traditionally expensive products can be affordable to individuals, such as phased array antennas and tunable filters.

The materials of the present invention provide increased tuning characteristics, very stable structure with applied voltage, good loss characteristics, lower sintering temperatures, variable dielectric constants, lower dielectric constant while maintaining tuning, and the ability to be processed in water. Furthermore, many metal silicates are found in abundance naturally and are therefore less expensive compared with other ceramic oxides.

Whereas particular embodiments of this invention have been described above for purposes of illustration, it will be evident to those skilled in the art that numerous variations of the details of the present invention may be made without departing from the invention as defined in the appended claims.

What is claimed is:

1. An electronically tunable dielectric material comprising;
    at least one electronically tunable dielectric phase comprising barium strontium titanate; and
    at least one metal silicate phase comprising a silicate of at least one metal selected from Be, Mg, Ca, Sr, Ba, Ra, Li, Na, K, Rb, Cs, Al, Zr, Zn, Fr, B, Fe, Mn, Cu, Ce, Cr, La, Y, Ti, Ta, Nb, Mo, W, Ni, Pd, Pb and Bi, wherein the metal silicate comprise from about 5 to about 65 weight percent of material.

2. The electronically tunable dielectric material of claim 1, wherein the metal silicate phase comprises a silicate of at least one metal selected from Mg, Ca, Sr and Ba.

3. The electronically tunable dielectric material of claim 1, wherein the metal silicate phase comprises $Mg_2SiO_4$, $CaSiO_3$, $BaSiO_3$ and/or $SrSiO_3$.

4. The electronically tunable dielectric material of claim 1, wherein the barium strontium titanate is of the formula $Ba_xSr_{1-x}TiO_3$, where x is from about 0.15 to about 0.6.

5. The electronically tunable dielectric material of claim 1, wherein the metal silicate comprises from about 10 to about 50 weight percent of the material.

6. The electronically tunable dielectric material of claim 1, further comprising up to about 10 weight percent of at least one additional oxide material selected from oxides of Ba, Mg, Zr, Ca, Fe, Sr, Nb, Ta, Cr, Sn, Mn, W, Al, Ti, Na, K, Nd, Pr, Y and La.

7. The electronically tunable dielectric material of claim 1, wherein the material has a tunability of at least 10 percent at 8 V/micron.

8. The electronically tunable dielectric material of claim 1, wherein the material has a tunability of at least 25 percent at 8 V/micron.

9. A method of making an electronically tunable dielectric material comprising:

mixing particles of at least one electronically tunable dielectric material and particles of at least one metal silicate material, wherein the electronically tunable dielectric material comprises barium strontium titanate, the metal silicate material comprises a silicate of at least one metal selected from Be, Mg, Ca, Sr, Ba, Ra, Li, Na, K, Rb, Cs, Al, Zr, Zn, Fr, B, Fe, Mn, Cu, Ce, Cr, La, Y, Ti, Ta, Nb, Mo, W, Ni, Pd, Pb and Bi, and the metal silicate comprises from about 5 to about 65 weight percent of the material; and sintering the material.

10. The method of claim 9, wherein the electronically tunable dielectric particles and the metal silicate particles have average particle sizes of from about 0.1 to about 5 micron.

11. The method of claim 9, wherein the electronically tunable dielectric particles and the metal silicate particles have average particle sizes of from about 1.5 to about 2.5 micron.

12. The method of claim 9, wherein the metal silicate material comprises a silicate of at least one metal selected from Mg, Ca, Sr and Ba.

13. The method of claim 9, wherein the metal silicate material comprises $Mg_2SiO_4$, $CaSiO_3$, $BaSiO_3$ and/or $SrSiO_3$.

14. The method of claim 9, wherein the barium strontium titanate is of the formula $Ba_xSr_{1-x}TiO_3$, where x is from about 0.15 to about 0.6.

15. The method of claim 9, wherein the metal silicate comprises from about 10 to about 50 weight percent of the sintered mixture.

16. The method of claim 9, further comprising adding up to about 10 weight percent of at least one additional oxide material selected from oxides of Ba, Mg, Zr, Ca, Fe, Sr, Nb, Ta, Cr, Sn, Mn, W, Al, Ti, Na, K, Nd, Pr, Y and La to the electronically tunable dielectric and metal silicate particles.

17. The method of claim 9, wherein the sintered mixture has a tunability of at least about 10 percent at 8 V/micron.

18. The method of claim 9, wherein the sintered mixture has a tunability of at least about 25 percent at 8 V/micron.

* * * * *